United States Patent
Baker

(10) Patent No.: US 10,055,791 B2
(45) Date of Patent: Aug. 21, 2018

(54) TRADING AVAILABILITY UTILIZING ALTERNATE MESSAGING CHANNELS

(71) Applicant: TRADING TECHNOLOGIES INTERNATIONAL INC., Chicago, IL (US)

(72) Inventor: William Tigard Baker, Hoffman Estates, IL (US)

(73) Assignee: Trading Technologies International, Inc., Chicago, IL (US)

(*) Notice: Subject to any disclaimer, the term of this patent is extended or adjusted under 35 U.S.C. 154(b) by 847 days.

(21) Appl. No.: 14/530,505

(22) Filed: Oct. 31, 2014

(65) Prior Publication Data

US 2016/0125534 A1     May 5, 2016

(51) Int. Cl.
    *G06Q 40/04*        (2012.01)
    *H04W 4/14*        (2009.01)

(52) U.S. Cl.
    CPC .............. *G06Q 40/04* (2013.01); *H04W 4/14* (2013.01)

(58) Field of Classification Search
    CPC ...................................................... G06Q 40/04
    USPC ...................................................... 705/35–45
    See application file for complete search history.

(56) References Cited

U.S. PATENT DOCUMENTS

| | | | | |
|---|---|---|---|---|
| 6,381,241 B1* | 4/2002 | Ghirnikar | ............. | H04L 1/1809 340/7.2 |
| 7,742,219 B2* | 6/2010 | Kurozuka | .......... | G02B 26/0841 359/223.1 |
| 2002/0023048 A1* | 2/2002 | Buhannic | ............... | G06Q 10/10 705/37 |
| 2005/0015323 A1 | 1/2005 | Myr | | |
| 2010/0169208 A1 | 7/2010 | Janowski | | |

(Continued)

OTHER PUBLICATIONS

International Search Report and Written Opinion dated Jan. 21, 2016 issued in connection with International Application No. PCT/US15/57672, filed on Oct. 27, 2015, 14 pages.

*Primary Examiner* — Chia-Yi Liu
(74) *Attorney, Agent, or Firm* — McDonnell Boehnen Hulbert & Berghoff LLP

(57) ABSTRACT

Certain embodiments provide a method including determining a communication state of a trading device, the communication state based on one or more factors including a measured signal strength of a first channel, the trading device configured to utilize at least one of a first channel and a second channel to communicate. The example method includes comparing the communication state to a communication criterion. The example method includes reconfiguring, based on the comparison of the communication state to the communication criterion, the trading device from transmitting using only the first channel to transmitting using both the first channel and the second channel. The example method includes assigning a first identifier to a first trading order. The example method includes transmitting the first trade order to a server using both the first and the second channel, the first channel transmitting the first trade order using the first identifier in a first message and the second channel transmitting the first trade order using the first identifier in a second message such that the server is to process only one of the first message and the second message based on the first identifier and a time of receipt of the first message and the second message.

12 Claims, 9 Drawing Sheets

(56) References Cited

U.S. PATENT DOCUMENTS

2012/0173400 A1\* 7/2012 Deitz .................. G06Q 40/00
              705/35
2013/0110701 A1 5/2013 Schweickert et al.
2014/0122320 A1 5/2014 Dantzig et al.

\* cited by examiner

TRADING AVAILABILITY UTILIZING ALTERNATE MESSAGING CHANNELS

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

A mobile trading device such as a smart phone, a tablet, etc. is generally in communication with the electronic exchange by utilizing a wireless data connection. Additionally, the mobile trading device generally maintains a separate wireless communication connection typically used for voice and text communications. In some instances, one or more factors may affect one or more of the wireless connections of the mobile trading device.

BRIEF DESCRIPTION OF THE FIGURES

Certain embodiments are disclosed with reference to the following drawings.

Figure 1:
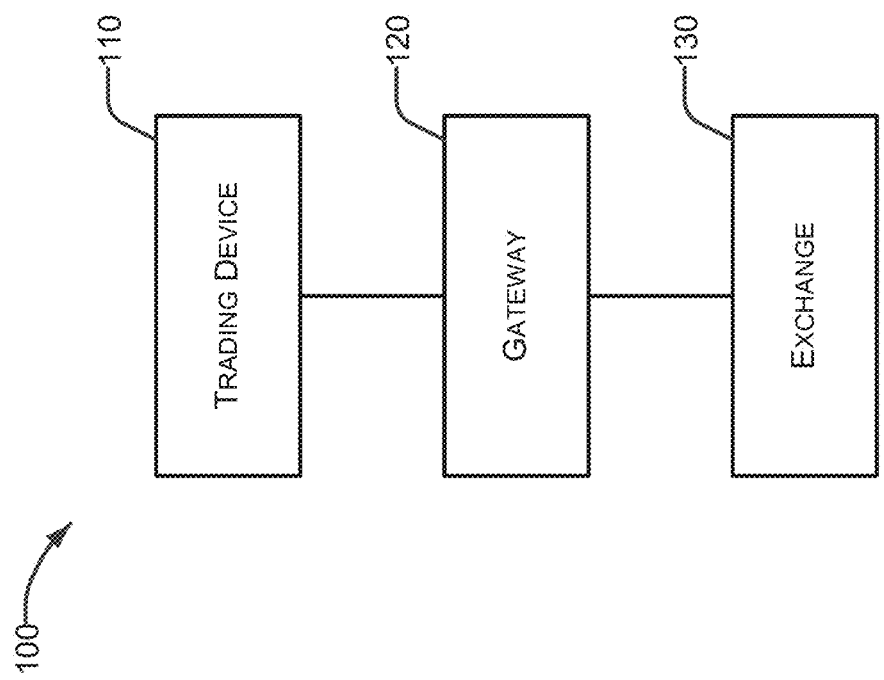
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

This disclosure relates generally to electronic trading systems and, more specifically, improving mobile trading availability through text messages.

Mobile or portable trading devices such as smartphones, tablets, etc. may establish communication links with a wireless communication provider over a plurality of communications channels. Typically, modern devices may utilize two channels. The first channel may provide Internet protocol communication (e.g. a data connection) through, for example, the Long-Term Evolution (LTE) standard. The second channel may facilitate voice (e.g., telephonic sessions) and/or text messaging (e.g., short message service (SMS)) through, for example, the Global System for Mobile Communication (GSM) standard. Hereafter, the first channel may be alternatively referred to as a data connection, and the second channel may be alternatively referred to as a communications connection.

A state of one or more communication factors (e.g., connective integrity of one or more connections of the mobile trading device, transmission latency of the one or more connections of the mobile trading device, geographic location of the trading device, power level of the mobile device, etc.) related to the one or more connections (e.g., data and/or communications) may affect an ability of the mobile trading device to communicate with an electronic exchange. For example, if connective integrity (e.g., signal strength) of a data connection of a mobile computing device is insufficient, communication between the mobile trading device and the electronic exchange may be inhibited, hindered, and/or error prone. However, in some examples, the connective integrity of the communications connection of the mobile computing device is much stronger than that of the data connection. That is, the communications connection may be used to send a text message using the SMS protocol to the electronic exchange at a higher delivery success rate than using the data connection. Thus, it may be advantageous to utilize both connections to send the trading order. Utilizing both the data and the communications connection may provide message redundancy and may also help ensure that such messages are delivered from the mobile trading device and the electronic exchange.

Embodiments disclosed herein improve mobile trading availability through using text messages instead of and/or in addition to data channel communication. Certain embodiments include monitoring a connection established between a mobile trading device and a wireless communication provider, and determining a communication state related to the data connection. When a trading order is executed at the mobile trading device, the communication state of the data connection is compared to a threshold. In response to the communication state being below the threshold, both the data and the communications connections are utilized to send the trading order to an electronic exchange.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. BRIEF DESCRIPTION OF CERTAIN EMBODIMENTS

Certain embodiments provide a method including determining a communication state of a trading device, the communication state based on one or more factors including a measured signal strength of a first channel, the trading device configured to utilize at least one of a first channel and a second channel to communicate. The example method includes comparing the communication state to a communication criterion. The example method includes reconfiguring, based on the comparison of the communication state to the communication criterion, the trading device from transmitting using only the first channel to transmitting using both the first channel and the second channel. The example method includes assigning a first identifier to a first trading order. The example method includes transmitting the first trade order to a server using both the first and the second channel, the first channel transmitting the first trade order using the first identifier in a first message and the second channel transmitting the first trade order using the first identifier in a second message such that the server is to process only one of the first message and the second message based on the first identifier and a time of receipt of the first message and the second message.

Certain embodiments provide a system including a trading device configured to determine a communication state of a trading device, the communication state based on one or more factors including a measured signal strength of a first channel, the trading device configured to utilize at least one of a first channel and a second channel to communicate. The example trading device is configured to compare the communication state to a communication criterion. The example trading device is configured to reconfigure, based on the comparison of the communication state to the communication criterion, the trading device from transmitting using only the first channel to transmitting using both the first channel and the second channel. The example trading device is configured to assign a first identifier to a first trade order. The example trading device is configured to transmit the first trade order to a server using both the first and the second channel, the first channel transmitting the first trade order using the first identifier in a first message and the second channel transmitting the first trade order using the first identifier in a second message such that the server is to process only one of the first message and the second message based on the first identifier and a time of receipt of the first message and the second message.

Certain embodiments provide a tangible computer-readable storage medium comprising instructions that, when executed, cause a computing device to at least determine a communication state of a trading device, the communication state based on one or more factors including a measured signal strength of a first channel, the trading device configured to utilize at least one of a first channel and a second channel to communicate. The example instructions cause the computing device to at least compare the communication state to a communication criterion. The example instructions cause the computing device to at least reconfigure, based on the comparison of the communication state to the communication criterion, the trading device from transmitting using only the first channel to transmitting using both the first channel and the second channel. The example instructions cause the computing device to at least assign a first identifier to a first trade order. The example instructions cause the computing device to at least transmit the first trade order to a server using both the first and the second channel, the first channel transmitting the first trade order using the first identifier in a first message and the second channel transmitting the first trade order using the first identifier in a second message such that the server is to process only one of the first message and the second message based on the first identifier and a time of receipt of the first message and the second message.

II. EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradable objects to the exchange 130.

Market data may include data about a market for a tradable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradable object is anything which may be traded. For example, a certain quantity of the tradable object may be bought or sold for a particular price. A tradable object may include, for example, financial products, stocks, options, bonds, future contracts, currency, warrants, funds derivatives, securities, commodities, swaps, interest rate products, index-based products, traded events, goods, or a combination thereof. A tradable object may include a product listed and/or administered by an exchange, a product defined by the user, a combination of real or synthetic products, or a combination thereof. There may be a synthetic tradable object that corresponds and/or is similar to a real tradable object.

An order message is a message that includes a trade order. A trade order may be, for example, a command to place an order to buy or sell a tradable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof. Alternatively, the example gateway 120 may be implemented by a synthetic order server (e.g., ASE, SSE, AlgoSE, etc.).

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradable objects, for example, offered for trading by the exchange, to be bought and sold. The exchange 130 may include separate entities, some of which list and/or administer tradable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradable objects. Unmatched trade orders may be listed for trading by the exchange 130. Once an order to buy or sell a tradable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. EXPANDED EXAMPLE ELECTRONIC TRADING SYSTEM

Figure 2:
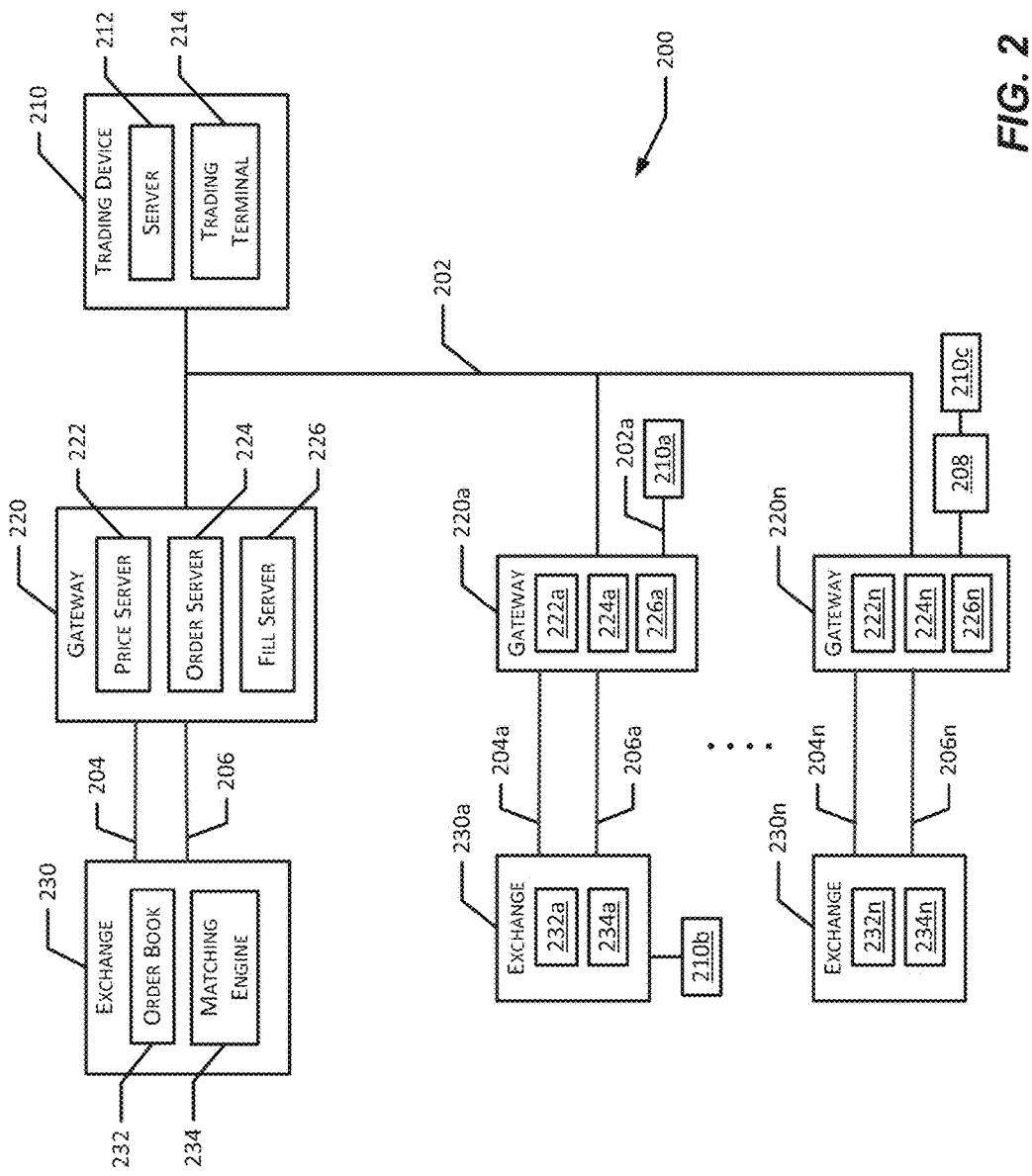
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210, for example. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. EXAMPLE COMPUTING DEVICE

Figure 3:
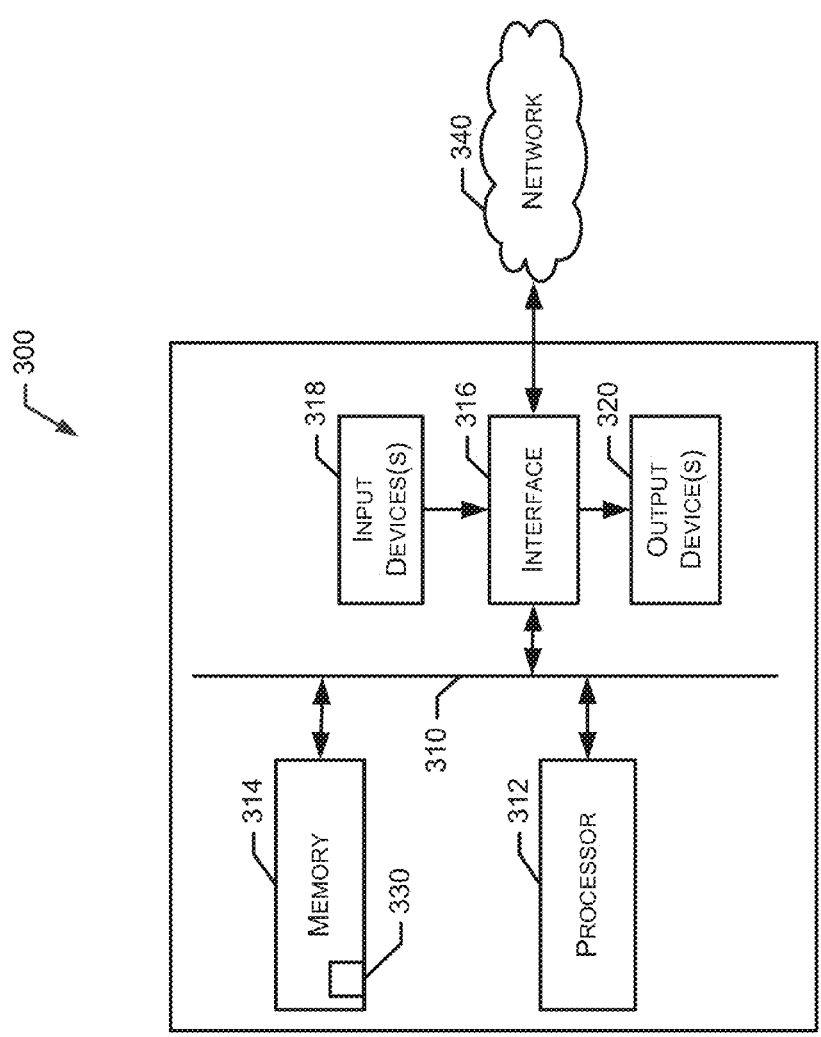
FIG. 3 illustrates a block diagram of an example computing device which may be used to implement the disclosed embodiments.

FIG. 3 illustrates a block diagram of an example computing device which may be used to implement the disclosed embodiments. The trading device 110 of FIG. 1 may include one or more computing devices 300, for example. In some examples, the example trading device may be a mobile trading and/or computing device (e.g., smartphone, tablet, smartwatch, etc.). The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. IMPROVING TRADING AVAILABILITY THROUGH TEXT MESSAGING

Example methods to improve trading availability on a device through text message are disclosed herein.

When a trader uses a trading device, many communication channels may be utilized. For example, a communications connection and/or a data connection may be established to facilitate communication. Generally, to communicate with an electronic exchange, a data communication link over the data connection is established between the trading device 210 and a gateway 220. This data communication link may provide access to one or more markets at the exchange. The data communication link may also enable the trading device 210 to interact with the gateway.

In some examples, a text communication link over the communications connection is established between the trading device 210 and a base station of a mobile telephone network. For example, a frequency (e.g., a channel) used for communication between a base station and a trading device 210 may be utilized to send text messages. Generally, such base stations are communicatively coupled to a short message service center (SMSC). The SMSC is responsible for storing, routing, and/or delivering text messages sent over a mobile telephone network. Additionally, the SMSC may be communicatively coupled to wide area network, such as the Internet, for example. By being in communication with the Internet, for example, the SMSC may route text messages via an Internet protocol (e.g., hypertext transfer protocol (HTTP)) to a gateway or server. Examples disclosed herein leverage the cross network ability provided by an SMSC to provide communication redundancy between a trading device 210 and a gateway.

Generally, a trading device (e.g., trading device 210) is used in an environment where data connections are quite strong. For example, an office environment typically contains many wireless access points. The abundance of these wireless access points provides the office with a robust broadcast of a wireless data connection. Thus, problems typically do not arise with data communications occurring in such an environment. However, in some examples, a mobile or portable trading device 210 may be utilized in an environment where the data connection of the trading device 210 may be unreliable, while the communications connection operates normally.

The data connection of the trading device 210 may be affected by one or more communication criterion. The communication criterion are one or more functions, characteristics, and/or attributes of the trading device 210 and/or the data connection that enable, affect, and/or support communication between the trading device 210 and the exchange via the data connection. The communication criterion include, for example, a strength of the signal of the data connection received via the trading device 210 (e.g., a connectivity level of the trading device 210), and latency at a gateway server. A qualitative and/or quantitative measurement, value, and/or status of a communication criterion is characterized as a state of the communication criterion (referred to herein as "a communication state"). If the communication state deteriorates below a minimum threshold state, the communication between the trading device 210 and the exchange may be interrupted (e.g., delayed, incomplete, and/or substantially impaired). Thus, the communication state reflects an ability of the trading device 210 to communicate with the exchange via the data connection.

Certain examples disclosed herein monitor the data communication link established via the data connection between the trading device 210 and a gateway. For example, the trading device 210 may measure a strength of the signal of the data connection received by the trading device 210. The examples may also include determining a communication state related to the data communication link (e.g., a connectivity level of the trading device 210 relative to a maximum or best possible connectivity level).

In some examples, a transmission redundancy threshold is set (e.g., by a user, automatically by a trading application, etc.). For example, the transmission redundancy threshold may be a predetermined state of a communication criterion at which an ability of transmission via the data connection between the trading device 210 and the exchange may be impaired. In some examples, the transmission redundancy threshold may be set at a given percentage of a maximum or best possible signal strength to be received by the trading device. If the trading device detects a signal having a strength at or below the given percentage, a transmission redundancy action is initiated at the trading device 210. For example, the transmission redundancy action may include assigning an identifier to a detected trade order, determining the priority of the trading order, generating at least two order messages containing the trade order and the identifier, and transmitting the messages using an SMS message across a communications connection and an HTTPS message across a data connection. If the communication state falls below the transmission redundancy threshold, a transmission redundancy action may be initiated at the trading device 210.

The transmission redundancy action may be the utilization of the data connection as well as the communications connection of the trading device 210 to send an order message to the electronic exchange. In some examples, the order message is sent via the communications connection by way of a text based message (e.g., an SMS message). The above-noted transmission redundancy action is merely an example and, thus, other transmission redundancy actions may be performed without departing from the scope of this disclosure. For example, each connection established by the trading device 210 may be utilized to send order messages in the event that the communication state is below the transmission redundancy threshold.

Certain examples disclosed herein assign an identifier to the trade order when the example trading device 210 utilizes a transmission redundancy action. In some examples, the assigned identifier may be used to prevent dual orders from a gateway to an electronic exchange on behalf of the user of the trading device 210. In some examples, an identifier (e.g., a hash code, a sequential identifier, a string, a numeric value, a hex code, a proprietary identification, etc.) is included in the order message when it is sent to the gateway 220. In other examples, the identifier may also include an indicator of priority. For example, a trading order such as a "cancel" may carry a high priority indicator. The priority indicator may be used to notify the gateway to expedite the trading order, or move the trading order substantially closer to execution in a service queue.

As an illustrative example, when the trading device 210 is taking a transmission redundancy action, two messages containing the same desired trade order (e.g., a buy order for 10 shares of Company X) may be transmitted. A message may be sent via the low strength data connection (e.g., an HTTPS message) and another message may be sent using a more robust communications connection (e.g., an SMS message). An identical identifier (e.g., a hex value of A0E3) for the trade order may be included in both messages so that the gateway may acknowledge a first received message and ignore subsequent received trading orders having the same identifier. In the example, the message sent via the communications connection may arrive at the gateway before the message sent using the data connection. Upon determining that a message with the identifier has not been received, the gateway forwards the order message sent via the communications connection to the electronic exchange. Later, the message sent via the data connection arrives at the gateway. When processing the data connection message of the trading device 210, the gateway determines that such an identifier has been observed. Consequently, the gateway ignores and/or discards the data connection message at least because the identifier has been observed before and/or the trade order identified in the message has been forwarded to the electronic exchange.

Certain examples disclosed herein determine the communication state based on a location of the trading device 210. In some examples, the trading device 210 is associated with the communication state based on a map. In some examples, the map includes areas that are associated with communication states. In some examples, the map is generated and/or updated based on communication states communicated via a plurality of other trading devices located in the areas. If the trading device 210 is located in one of the areas, the trading device 210 may be associated with the communication state associated with that area.

Figure 4:
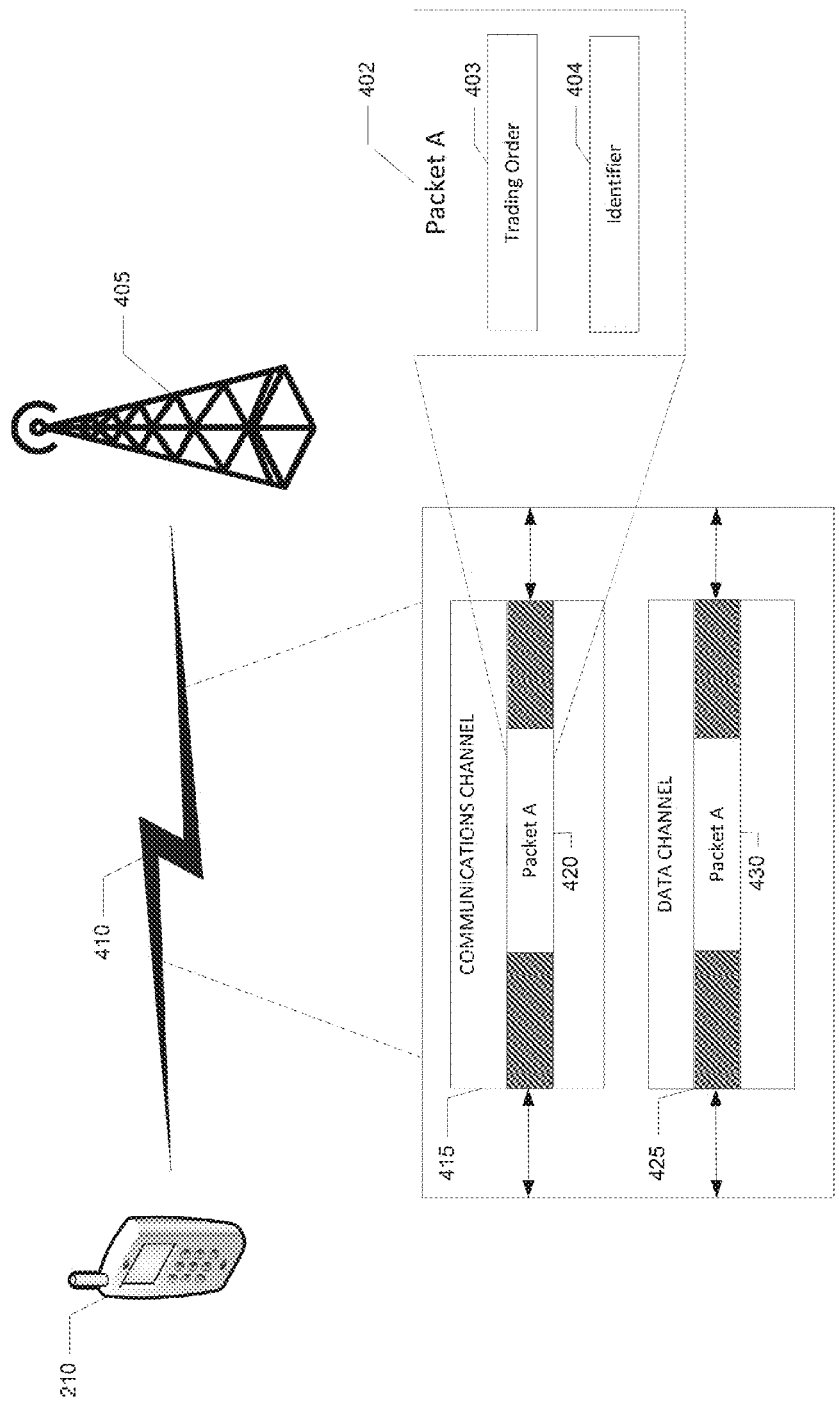
FIG. 4 illustrates an example system operating in accordance with the teaching of the disclosure.

FIG. 4. illustrates an example system 400 including an example trading device 210 in communication 410 with an example base station 405, the trading device 210 utilizing transmission redundancy. The example trading device 210 may be a mobile or portable trading device such as, for example, a hand-held device, a laptop, a tablet, a cell phone, a portable computing device, etc.

The trading device 210 generates a packet (e.g., packet A 402) during a transmission redundancy action. The packet 402 comprises a trading order 403 and an identifier 404. The trading order 403 may contain any request or query to be executed at the behest of a trading party (e.g., the trader using a trading device). For example, the trading order 403 may be a request for price updates, market position changes, etc.

The identifier 404 is a unique identification assigned to the trading order 403 during the execution of a transmission redundancy action. The identifier 404 may be a uniquely generated identification based on, for example, any identifying information about at least one of the trading order 403, the trader associated with the trading device 210, the trading device 210 identification, etc. In other examples, the unique identification is independent of any identifying information such as those non-exhaustively enumerated above.

The example base station 405 of the system 400 of FIG. 4 provides communication 410 over two example channels 415, 425. For example, the example base station 405 may be an access point (e.g., a standard mobile base station, a microcell, a picocell, a femtocell, etc.) that is accessible using cellular communication technology (e.g., global system for mobile communication (GSM), code division multiple access (CDMA), etc.). The base station 405 is an active base station that provides communication services to a subscriber network (e.g., Verizon, AT&T, T-Mobile, Sprint, etc.). The example base station 405 may also facilitate communication between the trading device 405 and a network (e.g., a local area network (LAN), a wide area network (WAN), the Internet, and/or a cellular phone system) via a specific channel (e.g., data channel 425) or routing device.

The example communications channel 415 of the example system 400 of FIG. 4 is a communications connection between the example trading device 210 and the base station 405. The communications channel 415 may be a cellular or mobile network such as a Global System for Mobile Communications (GSM) network, a Personal Communications Service (PCS) network, a Digital Advanced Mobile Phone Service (D-AMPS) network, a 3G network, a 4G network, and/or any other wireless communication network, all of which may be terrestrial and/or satellite based. The example communications channel 415 is utilized to facilitate telephonic sessions as well as text based communications. In the example of FIG. 4, the trading device 210 sends text communications (e.g., SMS Packet A 420*a* and SMS Packet B 420*b*) via the communications channel 415.

The example data channel 425 depicted in the example of FIG. 4 may be a data channel such as a Wi-Fi network (e.g., a IEEE 802.x network), a Long-Term Evolution (LTE) network, a global system for mobile (GSM) communication network, a time division multiple access (TDMA) network, a code division multiple access (CDMA) network, an orthogonal frequency division multiplexing (OFDM) network, High Speed Packet Access (HSPA(+)) network, and/or Worldwide Interoperability for Microwave Access (WiMAX). Example data channels may be, and/or may include, a terrestrial based systems and a satellite relay systems. In the example of FIG. 4, the trading device 210 transmits data (e.g., Internet protocol packet A 430) via the data channel 425.

In the example FIG. 4, the trading device 210 executes a trading order. When the trading order is executed, the trading device 210 determines that a communication criterion of the current communication state of the data connection (e.g., signal strength) is below the transmission redundancy threshold. For example, the trading device 210 may determine that signal strength of the data connection 425 is not strong enough to indicate a sufficient probability of a successful transmission. Therefore, the trading device 210 utilizes a transmission redundancy action. An identifier is assigned to the trading order. Then, the trading order and the identifier are packaged together in a data packet. The packet is then sent via an SMS message (e.g., SMS Packet A 420) and via an HTTPS message (e.g., Internet Protocol Packet A 430) to the gateway via the base station 405.

Figure 5:
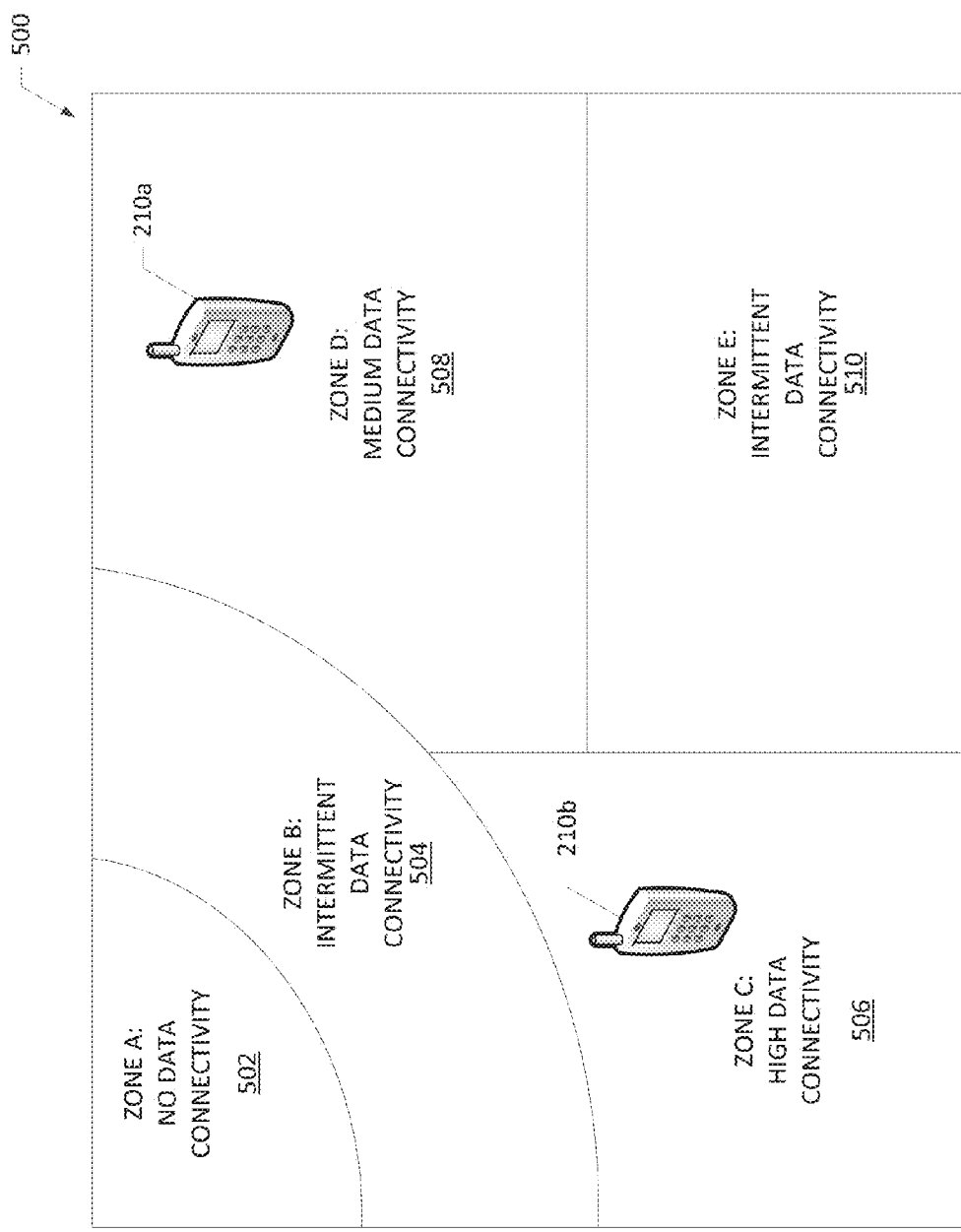
FIG. 5 illustrates an example trading area in accordance with the teachings of this disclosure.

FIG. 5 illustrates an example map of an area 500 in which example trading devices 210a/210b may be located. In the illustrated example, the area 500 includes a plurality of zones 502, 504, 506, 508, 510. Each of the example zones 502, 504, 506, 508, 510 defines a geographic region as a function of a communication criterion evaluated with respect to the trading devices 210a/210b. In the illustrated example, the communication criterion is a connectivity level of the trading devices 210a/210b data connection (e.g., data connection 425 of FIG. 4). For example, Zone A 502 is associated with no data connectivity; Zone B 504 is associated with intermittent data connectivity; Zone C 506 is associated with high data connectivity, etc. In other examples, the zones 502, 504, 506, 508, 510 are associated with other states and/or communication criterion such as the signal-to-noise ratio, and the type of network available. The example zones 502, 504, 506, 508, 510 may correspond to buildings, streets, cities, areas defined by global positioning system ("GPS") coordinates, and/or any other type of area.

In the illustrated example of FIG. 5, a state of a communication criterion is determined based on a signal strength of the trading devices 210a/210b. In some examples, the trading devices 210a/210b may determine their signal strength via a wireless radio device. If the trading devices 210a/210b are located in one of the zones 502, 504, 506, 508, 510, the trading devices 210a/210b are associated with a state of the communication criteria (e.g., a data connectivity level) of the zone 502, 504, 506, 508, 510 in which the trading devices 210a/210b is located. For example, if the trading device 210a determines that it is located in Zone D 508, the trading device 210a is associated with the communication state that is associated with Zone D 508: medium data connectivity. If medium data connectivity is at or below the transmission redundancy threshold, a transmission redundancy action is initiated. Alternatively, if trading device 210b determines that it is located within Zone C 506, the trading device 210b is associated with the communication state that is associated with Zone C 506: high data connectivity. In some examples, such high data connectivity may not trigger the transmission redundancy action. In other examples, if the trading devices 210a/210b are within a predetermined distance (e.g., five hundred feet) from a zone associated with a communication state at or below the transmission redundancy threshold, the transmission redundancy action is initiated. For example, a transmission redundancy action may be executed with respect to trade orders on the trading device 210a, when the trading device is located near the zone associated with the communication state at or below the transmission redundancy threshold.

In the illustrated example, a map is generated (e.g., the zones 502, 504, 506, 508, 510 are determined and/or associated with the communication criterion) based on communication states and trading device locations communicated by a plurality of trading devices including the trading devices 210a/210b and other trading devices. For example, each of the trading devices 210a/210b monitors a communication state and its location and communicates the communication state and its location to a central location such as the gateway 220a. Based on the communication states and the locations, a host generates and/or updates the map. In some examples, the map includes a table, a matrix, and/or a database, etc. that includes the communication states and the device locations. In some examples, the map includes a graphical representation of an area. The map may be communicated to the trading devices 210a/210b to enable the trading devices to assess communication risks (e.g., a need to execute a transmission redundancy action) based on their locations and the map.

Figure 6A:
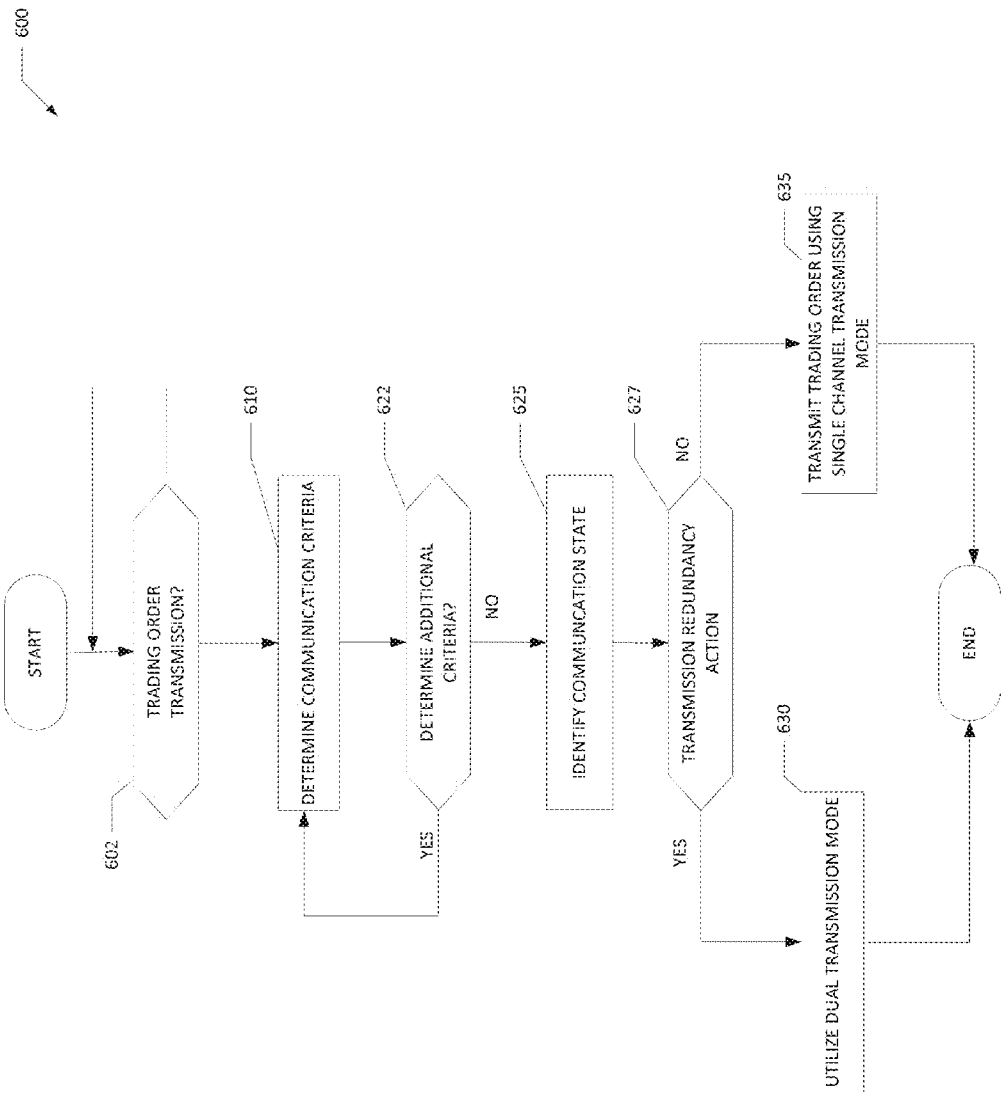
FIG. 6A illustrates a flow diagram of an example method to improve trading availability through text messages in accordance with the teachings of this disclosure.

FIG. 6A is a flow diagram of an example method 600 to improve trading availability through text messaging. The example method 600 may be performed by any trading device (e.g., the trading device 210 of FIG. 2, the trading device 210 of FIG. 4, etc.). The example method 600 begins by monitoring the trading device 210 for an execution of a trading order (block 602). When a trading order is detected, one or more communication criterion are determined (block 610).

The trading device 210 gathers at least one of the signal strength of the data connection 425, geographic location of the trading device 210, and/or a ping duration of the data connection (e.g., the travel time of a message from the trading device 210 to the gateway) to identify the communication state of the trading device 210. The trading device 210 then determines if a communication state may be identified (block 622). For example, if the signal strength of the data connection is high, a communication state may not be identified because other factors such as, a geographic location or the ping duration, may indicate a need to execute a transmission redundancy action. If the trading device 210 determines that enough information has been gathered, then the trading device 210 identifies the communication state (block 625). If the trading device 210 is unable to make such a determination, the trading device 210 will continue to gather additional information on the communication criterion (e.g., return to block 610).

When the communication state has been identified (e.g., at block 625), the trading device 210 determines if a transmission redundancy action may be executed (block 627). In the illustrated example method of FIG. 6A, the communication state identified by the trading device 210 (e.g., at block 625) is compared to a transmission redundancy threshold. If the communication state exceeds the transmission redundancy threshold, the trading device 210 proceeds to send the trading order across the data connection (block 635). However, if the communication state is determined by the trading device 210 to be below the transmission redundancy threshold, the trading device 210 proceeds to take a transmission redundancy action (block 630).

Figure 6B:
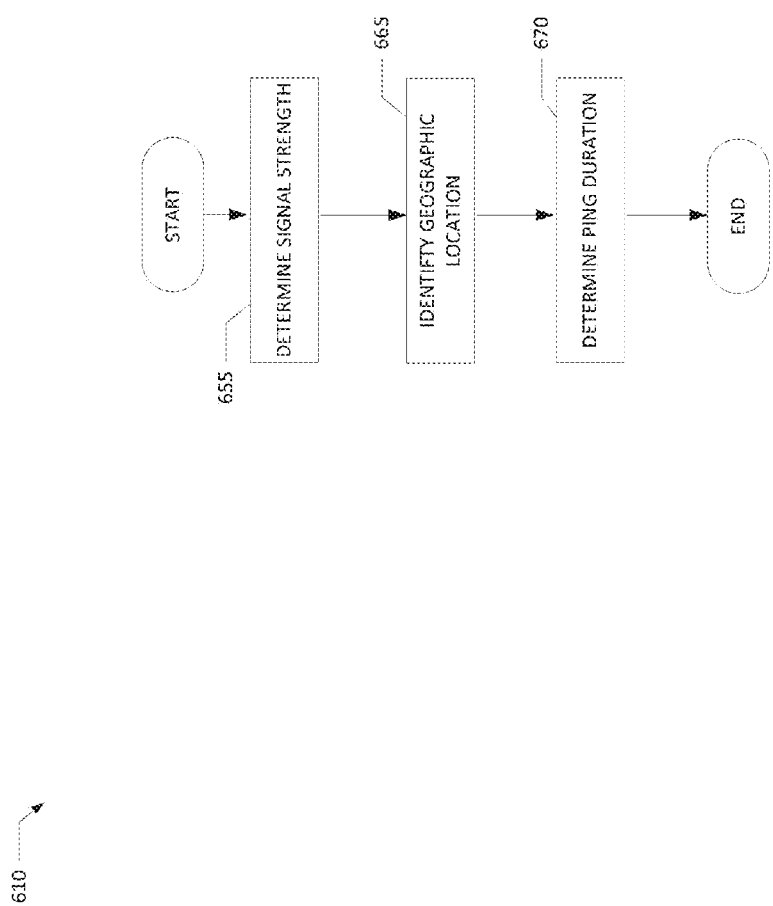
FIG. 6B illustrates a flow diagram of another example method to improve trading availability through text messages in accordance with the teachings of this disclosure.

FIG. 6B is a flow diagram of an example method for implementing the instructions of block 610. Certain examples may conduct the instructions of FIG. 6B in a singular fashion. That is, a single block of FIG. 6B may executed at a time in any order. Certain other examples may conduct the instructions of each of the blocks of FIG. 6B substantially simultaneously. Yet, certain other examples may conduct additional actions within FIG. 6B according to further identified communication criterion such as signal to noise ratio, etc.

The trading device 210 of the illustrated example of FIG. 6B begins by determining the signal strength of the data connection 425 (block 655). For example, the signal strength may be obtained as a value (e.g., a value in dBm, or Decibel-milliwatts) or may be obtained as a percentage value compared to a maximum or best possible signal strength.

The trading device 210 also may determine the geographic location of the trading device 210 (block 655). For example, the location may be determined via a GPS associated with the trading device 210. Additionally or alternatively, the location may be determined according to the map, locations, and examples discussed in conjunction with FIG. 5.

The trading device 210 also may determine a ping duration of the data connection (block 670). The ping duration may be representative of the most recent travel time of a transmit and acknowledge pair. For example, the transmissions from the trading device 210 to the gateway may be timed according to a duration. The duration may be, for example, starting from the time of transmission of a message from the trading device 210 to the gateway and ending when the trading device 210 receives an acknowledgement of receipt of the message from the gateway. The duration of the most recent transmit acknowledge pair may be used at the time of the instructions of block 610 and/or block 670 to obtain the ping duration. Alternatively, a small test packet may be sent to the gateway at the time of the execution of block 670 to determine such a ping duration.

Figure 7:
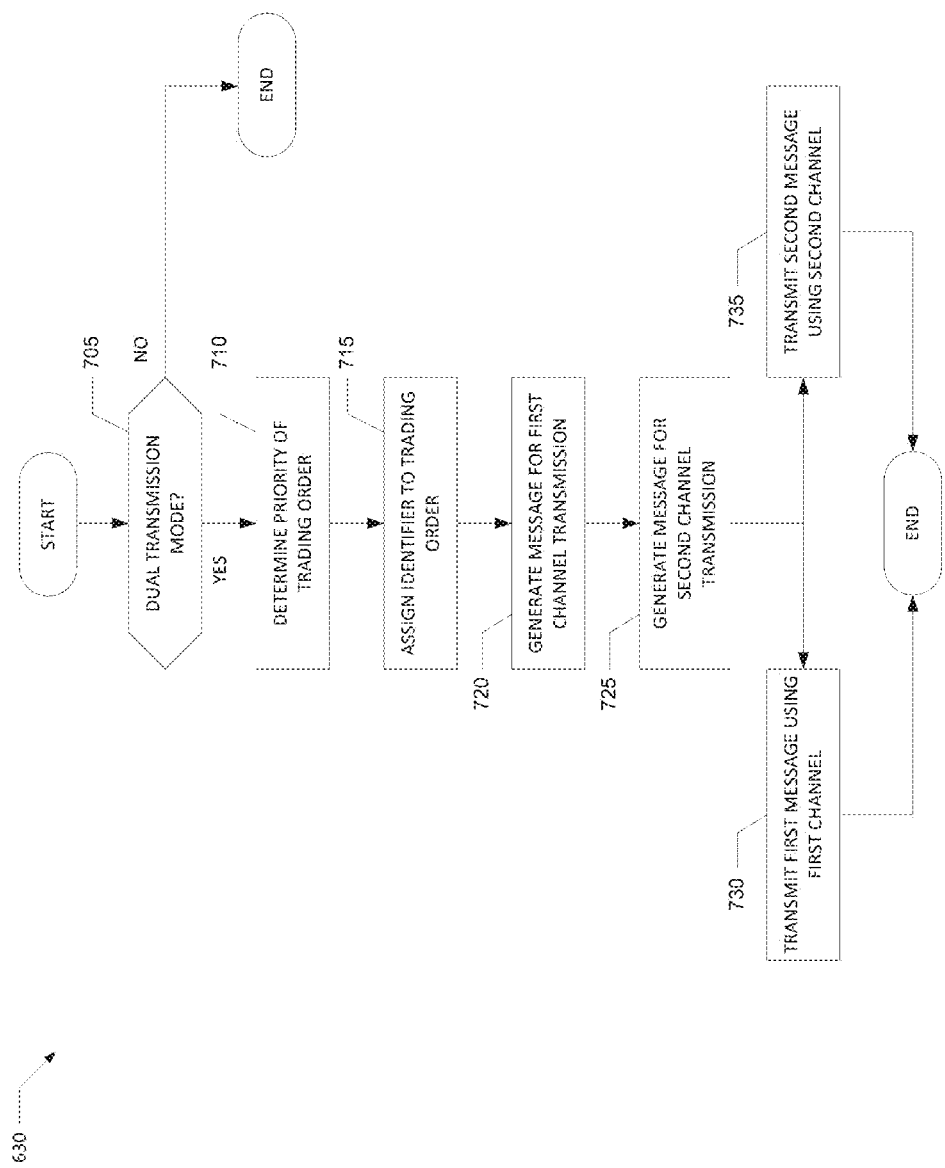
FIG. 7 illustrates a flow diagram of another example method to improve trading availability through text messages in accordance with the teachings of this disclosure.

FIG. 7 is a flow diagram of an example method for implementing the instructions associated with block 630 of example FIG. 6A. The example method 630 of FIG. 7 begins when the communication state is judged to be at or below the transmission redundancy threshold (e.g., at block 627 of FIG. 6). The trading device 210 determines if the transmission redundancy action should be taken in response to the detection of the trading order (e.g., at block 602 of FIG. 6A). If the trading device 210 has arrived at block 705 in error, the routine ends and moves to block 635 to send the trading order across the data connection. However, when the trading device 210 determines that the transmission redundancy action should be executed, the trading device 210 then determines the priority of the trading order (block 710).

For example, some trade orders carry instructions regarding market position changes that may be relevant to a trading strategy. Such actions include pause, cancel, hold, change (e.g., valuation and/or quantity), submit orders to an exchange, and/or release hold orders.

When the priority has been identified, the trading device 210 assigns an identifier to the trading order (block 715). For example, the trading device 210 may assign an identifier a number of ways. In some examples, the identifier is a uniquely generated identification based on any identifying information about at least one of the trading order, the priority of the trading order, the user of trading device 210, the trading device 210 identification, etc. In other examples, the unique identification is independent of any identifying information such as those non-exhaustively enumerated above. A packet may be generated containing the trading order and the identifier.

The trading device 210 generates a first message containing the packet according to the protocol of the data connection 425 (block 720). For example, the first message may be an internet protocol formatted message such as an HTTPS message (e.g., Internet Protocol Packet A 430). The trading device also generates a second message according to the communications connection 415 (block 725). For example, the second message may be an SMS message (e.g., SMS packet A 420). The trading device 210 then proceeds to transmit the first and the second messages to the gateway for routing to the exchange (blocks 730 and 735). The example instructions 720/725 and 730/735 may be executed substantially simultaneously and/or in any order with respect to the first and the second messages and are not limited by the illustration provided in example FIG. 7.

Figure 8:
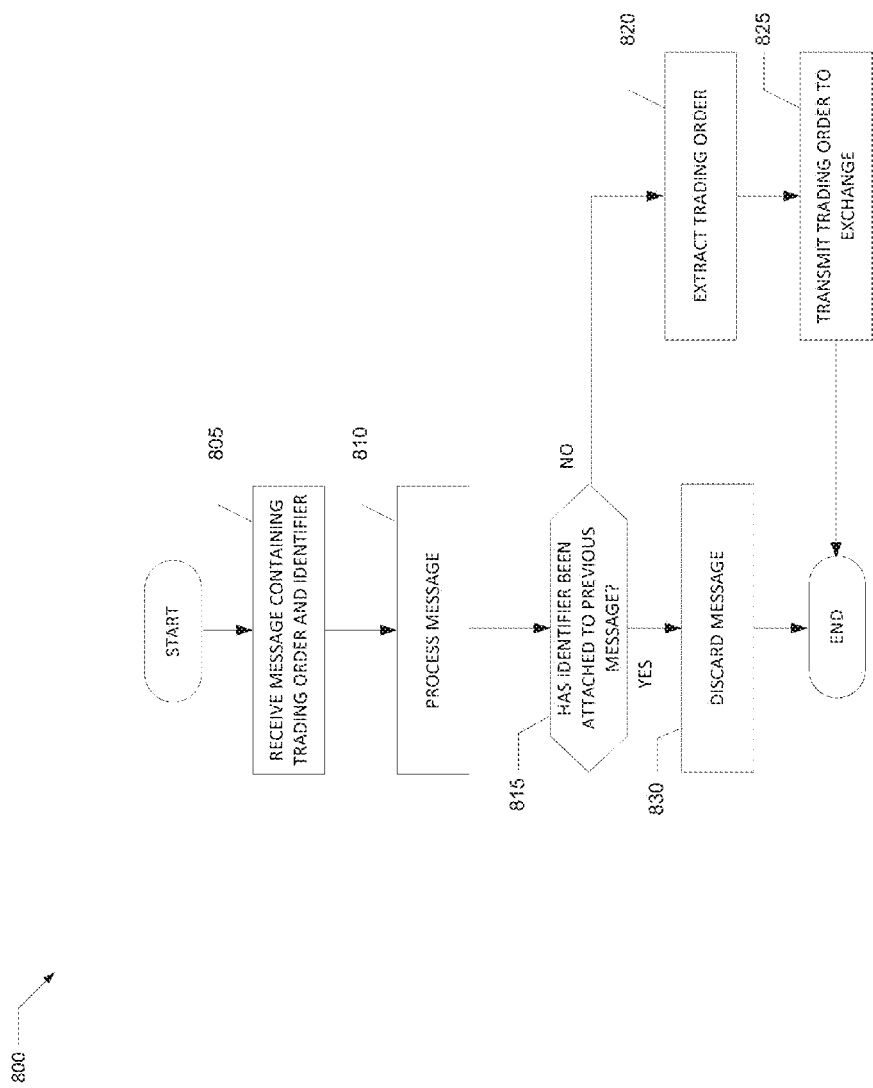
FIG. 8 illustrates a flow diagram of another example method to improve trading availability through text messages in accordance with the teachings of this disclosure.

FIG. 8 is a flow diagram of an example method 800 to improve trading availability through text messaging. The example method 800 may be performed by any gateway device (e.g., the gateway device 220 of FIG. 2, etc.). The example method 800 begins when an order message transmitted by an example trading device 210 according to this disclosure is received at a gateway 220, wherein the order message contains a trading order and/or an identifier (block 805).

The gateway 220 processes the received order message to extract the trading order 403 and the identifier 404 (block 810). The gateway 220 analyzes the identifier to determine whether the identifier has been seen by the gateway 220 before (block 815).

For example, two order messages may be sent as a result of a transmission redundancy action, wherein the messages carry matching identifiers. Thus, the gateway 220 may verify that a message containing the same identifier has been received. It is advantageous to utilize such an identifier in the event that multiple orders of the same type and quantity are executed by a trader. Without an identifier, three buy orders of identical quantity and price placed by a trader may not be accurately filled. Relying upon the trade order alone may, in some instances, lead to the gateway 220 discarding the second and third buy order. By utilizing the identifier, the gateway 220 may accurately recognize the second and third trade orders as legitimate trading orders.

If the identifier has been seen previously at the gateway 220, the message may be discarded or ignored (block 830). If the message is discarded or ignored, the example process 800 ends.

However, if the identifier has not been seen before at the gateway 220, the order message is further processed (block 820). The trading order is extracted from the order message by the gateway 220. The extracted trading order is transmitted to the electronic exchange by the gateway 220 (block 825) and the example instructions end.

To illustrate improving trade availability through text messaging an operational example is provided. A trading device 210 detects the execution of a trading order. The trading order is a buy request from user "ARJ" for 10 shares of Company X at a price of $25 per share, for example. When the trading order is detected, a signal strength of the data connection is determined. The signal strength communication criterion is determined by the trading device 210 to be below a transmission redundancy threshold for the communication state. In response to the communication state being below the transmission redundancy threshold, a transmission redundancy action is taken.

The trading device 210 assigns an identifier to the trading order. For example, the identifier may be of the form "ARJB 10X." The trading device 210 then generates a packet containing the requisite information of the trading order as well as the assigned identifier. The mobile computing device then generates two order messages. The first order message is a message containing the packet sent via the HTTPS protocol. The second order message is an SMS text message containing the packet. Both the first and the second order message are sent to the gateway 220. The first order message is sent using the data connection of the trading device 210. The second order message is sent using the communications connection. The gateway 220 receives both messages but only processes the first order message received. The gateway 220 recognizes the second message as redundant based on a review of the identifier associated with both messages. The gateway 220 extracts the trading order from the order message and transmits the trading order to the exchange 230 for execution.

By utilizing a transmission redundancy action, the trading devices availability to trade is greatly increased over existing methods. Providing alternative pathways to execute time sensitive instructions such as trading orders, for example, in potentially unreliable connectivity situations greatly improves the functionality of the trading device in the art of financial technologies.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
defining a communication redundancy threshold associated with a signal strength of a wireless data channel at a mobile trading device, wherein the mobile trading device uses the wireless data channel to send trade order messages to buy or sell a tradable object to an electronic exchange, wherein the communication redundancy threshold indicates a probability of a successful transmission of the trade order messages over the wireless data channel to the electronic exchange based on the signal strength at the mobile trading device;
detecting by the mobile trading device a first trade order to buy or sell the tradable object at the electronic exchange to be sent over the wireless data channel from the mobile trading device to the electronic exchange;
determining a signal strength of the wireless data channel at the mobile trading device via a wireless radio device associated with the mobile trading device;
determining a communication state of the mobile trading device based on at least one factor including the signal strength of the wireless data channel, the mobile trading device configured to utilize at least one of the wireless data channel and a text message channel to communicate;
comparing the communication state to the communication redundancy threshold;
reconfiguring, based on the comparison of the communication state to the communication redundancy threshold, the mobile trading device from transmitting the first trade order using only the wireless data channel to transmitting the first trade order to the electronic exchange using both the wireless data channel and the text message channel;
assigning a first identifier to the first trade order; and
transmitting the first trade order from the mobile trading device to a server using both the wireless data channel and the text message channel, wherein the first order is transmitted using the wireless data channel in a first trade order message comprising the first identifier, and wherein the first order is transmitted using the text message channel in a second trade order message comprising the first identifier, such that the server is to process only one of the first trade order message and the second trade order message based on the first identifier and a time of receipt of the first trade order message and the second trade order message.

2. The method of claim 1, wherein the at least one factor further comprises a geographic location of the mobile trading device, a power level of the mobile trading device, or a ping duration of the mobile trading device, wherein the ping duration is a length of time to return a message from the mobile trading device to the server across the wireless data channel.

3. The method of claim 1, wherein the first trade order comprises at least one of a request to modify a trade order at the electronic exchange, a new trade order, or a request to delete a trade order pending at the electronic exchange.

4. The method of claim 1, wherein the wireless data channel utilizes at least one of a time division multiple access (TDMA), code division multiple access (CDMA), orthogonal frequency division multiplexing (OFDM), global system for mobile (GSM) communications, Wi-Fi communication, Long Term Evolution (LTE) communication, a High Speed Packet Access (HSPA(+)) network, and a Worldwide Interoperability for Microwave Access (WiMAX).

5. The method of claim 1, wherein the second trade order message comprises a short message service (SMS) communication message.

6. The method of claim 1, wherein each of the first trade order message and the second trade order message further comprises a priority indicator, the priority indicator notifying the server to execute the first trade order if the first trade order message or the second trade order message arrives in an execution queue of the server inverse to an order of transmission.

7. A computer readable storage medium comprising instructions that, when executed, cause a mobile trading device to at least:
define a communication redundancy threshold associated with a signal strength of a wireless data channel at the mobile trading device, wherein the mobile trading device uses the wireless data channel to send trade order messages to buy or sell a tradable object to an electronic exchange, wherein the communication redundancy threshold indicates a probability of a successful transmission of the trade order messages over the wireless data channel to the electronic exchange based on the signal strength at the mobile trading device;
detect a first trade order to buy or sell the tradable object at the electronic exchange to be sent over the wireless data channel from the mobile trading device to the electronic exchange;
determine a signal strength of the wireless data channel at the mobile trading device via a wireless radio device associated with the mobile trading device;
determine a communication state of the mobile trading device based on at least one factor including the signal strength of the wireless data channel, the mobile trading device configured to utilize at least one of the wireless data channel and a text message channel to communicate;
compare the communication state to the communication redundancy threshold;
reconfigure, based on the comparison of the communication state to the communication redundancy threshold, the mobile trading device from transmitting the first trade order using only the wireless data channel to transmitting the first trade order to the electronic exchange using both the wireless data channel and the text message channel;
assign a first identifier to the first trade order; and
transmit the first trade order from the mobile trading device to a server using both the wireless data channel and the text message channel, wherein the first order is transmitted using the wireless data channel in a first trade order message comprising the first identifier, and wherein the first order is transmitted using the text message channel in a second trade order message comprising the first identifier, such that the server is to process only one of the first trade order message and the second trade order message based on the first identifier and a time of receipt of the first trade order message and the second trade order message.

8. The computer readable storage medium of claim 7, wherein the at least one factor further comprises a geographic location of the mobile trading device, a power level of the mobile trading device, or a ping duration of the mobile trading device, wherein the ping duration is a length of time to return a message from the mobile trading device to the server across the wireless data channel.

9. The computer readable storage medium of claim 7, wherein the first trade order comprises at least one of a request to modify a trade order at the electronic exchange, a new trade order, or a request to delete a trade order pending at the electronic exchange.

10. The computer readable storage medium of claim 7, wherein the wireless data channel utilizes at least one of a time division multiple access (TDMA), code division multiple access (CDMA), orthogonal frequency division multiplexing (OFDM), global system for mobile (GSM) communications, Wi-Fi communication, Long Term Evolution (LTE) communication, a High Speed Packet Access (HSPA (+)) network, and a Worldwide Interoperability for Microwave Access (WiMAX).

11. The computer readable storage medium of claim 7, wherein the second trade order message comprises a short message service (SMS) communication message.

12. The computer readable storage medium of claim 7, wherein each of the first trade order message and the second trade order message further comprises a priority indicator, the priority indicator notifying the server to execute the first trade order if the first trade order message or the second trade order message arrives in an execution queue of the server inverse to an order of transmission.

* * * * *